United States Patent [19]

Pennewiss et al.

[11] Patent Number: 5,043,087
[45] Date of Patent: Aug. 27, 1991

[54] ADDITIVES FOR PARAFFINIC LUBRICANTS

[75] Inventors: Horst Pennewiss, Darmstadt; Heinz Jost, Modautal; Helmut Knoell, Lautertal, all of Fed. Rep. of Germany

[73] Assignee: Röhm GmbH, Darmstadt, Fed. Rep. of Germany

[21] Appl. No.: 613,956

[22] Filed: Nov. 13, 1990

Related U.S. Application Data

[63] Continuation of Ser. No. 464,712, Jan. 12, 1990, abandoned, which is a continuation-in-part of Ser. No. 342,700, Apr. 24, 1989, abandoned, which is a continuation of Ser. No. 39,609, Apr. 17, 1987, abandoned.

[30] Foreign Application Priority Data

Apr. 25, 1986 [DE] Fed. Rep. of Germany ....... 3613992

[51] Int. Cl.$^5$ ................. C10M 145/14; C10M 149/02
[52] U.S. Cl. ............................. 252/51.5 R; 252/56 R
[58] Field of Search ...................... 252/51.5 R, 56 R

[56] References Cited

U.S. PATENT DOCUMENTS

| 2,091,627 | 8/1937 | Bruson | 87/9 |
| 2,100,993 | 11/1937 | Bruson | 260/2 |
| 2,114,233 | 4/1938 | Neher et al. | 260/2 |
| 2,655,479 | 10/1953 | Munday et al. | 252/56 |
| 4,209,925 | 9/1981 | Pennewiss et al. | 252/565 |
| 4,290,925 | 9/1981 | Pennewiss et al. | 252/56 S |
| 4,822,508 | 4/1989 | Pennewiss et al. | 252/56 R |
| 4,867,894 | 9/1989 | Pennewiss et al. | 252/56 R |

FOREIGN PATENT DOCUMENTS 0140274  5/1985  European Pat. Off. .
1559952  1/1980  United Kingdom .

Primary Examiner—Prince E. Willis
Assistant Examiner—Ellen McAvoy
Attorney, Agent, or Firm—Curtis, Morris & Safford

[57] ABSTRACT

Multifunctional additives for lubricating oils containing n-paraffins, said additives comprising a solvent and a blend of polymers containing
(I) from 10 to 99 percent by weight of one or more polymers P1 composed of monomers of
  (A) esters of methacrylic acid, acrylic acid, or both
    (a) with a linear alcohol having from 16 to 30 carbon atoms,
    (b) with a branched alcohol having from 8 to 40 carbon atoms, and optionally, other alcohols, and
(II) from 1 to 90 percent by weight to one or more polymers P2 composed of monomers of
  (A') esters of methacrylic acid, acrylic acid, or both
    (a') with a linear alcohol having from 16 to 30 carbon atoms, and, optionally other alcohols.

15 Claims, No Drawings

ADDITIVES FOR PARAFFINIC LUBRICANTS

The present application is a continuation of application Ser. No. 07/464,712 filed Jan. 12, 1990 and now abandoned, which is a continuation-in-part of application Ser. No. 07/342,700 filed Apr. 24, 1989 and now abandoned, which is in turn a continuation of application Ser. No. 07/039,609 filed Apr. 17, 1987 and now abandoned.

The present invention relates to multifunctional additives comprising polyalkyl acrylates or polyalkyl methacrylates for paraffinic petroleum oils, and particularly to such additives which improve the viscosity index (VI) of such oils, and to oils containing such additives.

The Prior Art

Petroleum oils usually contain n-paraffin hydrocarbons. While these hydrocarbons are conducive to obtaining good viscosity/temperature characteristics, they crystallize out upon cooling and thus inhibit or completely neutralize the fluidity of the oils.

An improvement in the low temperature flow properties of such oils can be obtained by dewaxing. Since the costs increase disproportionately with increasing paraffin content when the pour point is to be lowered below certain levels, the oils are generally only partially dewaxed to a pour point of about $-15°$ C. and further lowering of the pour point (to about $-40°$ C.) is then accomplished by the use of so called pour point depressants, which effectively lower the pour point even when present in concentrations from 0.05 to 1 percent.

With regard to their mode of action, it is hypothesized that paraffin-like compounds are incorporated into growing paraffin crystal surfaces and in his way prevent the further growth of the crystals and the formation of extensive interlocking networks of crystals. The mode of action of such pour point depressants is thought to be controlled by the presence of certain structural elements, namely alkyl groups that are sufficiently long to be incorporated into the growing paraffin crystals from the onset of nucleation and by the presence at fairly large intervals of side chains or side groups which interfere with crystal growth. [See *Ullmanns Enzyklopa die der technischen Chemie* ("Encyclopedia of Technical Chemistry"), 4th Ed., Vol. 20 (1981), pp. 548 ff., Verlag Chemie].

Technically usable pour point depressants, or VI improvers with pour point depressing action, must further possess good thermal, oxidative, and chemical stability, etc.

The currently preferred additives having a pour point depressing action (pour point depressants) are polymethacrylates which when used in concentrations ranging from 0.1 to 10.0 percent will sufficiently lower the pour point of lubricating oils. (See U.S. Pat. Nos. 2,091,627, 2,100,993, and 2,114,233). The number of carbon atoms in the alkyl groups ranges from 12 to 18 and the degree of branching from 10 to 30 mole percent. Polymethacrylates are available whose average molecular weight ranges from about 5000 to 500,000 and which permit improvement in the flow properties of light, low molecular weight lubricating oils.

European Patent Application 140,274 teaches additives for lubricating oils containing n-paraffins, which additives contain blends of certain acrylate polymers. These additives comprise a solvent and a blend of polymers which contain (I) from 10 to 99 percent by weight of one or more polymers P1 composed of
(A) esters of methacrylic or acrylic acid or both
  (a) with a linear alcohol having from 6 to 15 carbon atoms,
  (b) with a linear alcohol having from 16 to 30 carbon atoms,
  (c) with a branched alcohol having from 8 to 40 carbon atoms, and
  (d) esters of methacrylic or acrylic acid or both with an alcohol having from 1 to 5 carbon atoms, and
(B) monomers which have a functional group and which are capable of free radical copolymerization,
wherein the amount of component (a) is from 10 to 80 mole percent, the amount of component (b) is from 0 to 5 mole percent, the amount of component (c) is from 0 to 90 mole percent, the amount of component (d) is from 0 to 50 mole percent, and the amount of component (e) is from 0 to 20 mole percent, based in each case on the polymer P1, and
(II) from 1 to 90 percent by weight of one or more polymers P2 composed of
(A') esters of methacrylic or acrylic acid or both with a linear alcohol having from 6 to 15 carbon atoms,
(b') with a linear alcohol having from 16 to 30 carbon atoms,
(c') with a branched alcohol having from 8 to 40 carbon atoms, and
(d') with an alcohol having from 1 to 5 carbon atoms, and
(B') monomers which have functional groups in the molecule and are capable of free radical copolymerization,
wherein the amount of component (a') is from 0 to 90 mole percent, the amount of component (b') is from 10 to 70 mole percent, the amount of component (c') is from 0 to 90 mole percent, the amount of component (d') is from 0 to 50 mole percent, and the amount of component (B') is from 0 to 20 mole percent, based in each case on the polymer P2, in addition to a solvent.

THE OBJECT AND THE INVENTION

The availability of the additives of European Patent Application 140,274 undoubtedly permits important practical requirements to be met. On the other hand, the actual use of these additives would present new challenges.

For example, cost considerations might make substitution of the lower cost components (c) and/or (d) and/or (B) for the relatively expensive component (a) of the polymer P1 appear very attractive. However, it has been found that the good low temperature characteristics of the polymer P1 are increasingly degraded when component (a) of the polymer is replaced by the components (c), (d), and (B).

This would seem to defeat any efforts to modify the polymer system of the European patent application so a to bring down its cost.

It has now been found that the components (c) and/or (d) and/or (B) can be substituted for component (a) of the polymer P1 without significantly degrading its low temperature characteristics if small amounts, based on the rule given below, of component (b) are incorporated into the polymer P1.

The additives of the invention thus contain, in addition to the usual solvent, a blend of polymers consisting of (I) from 10 to 99 percent by weight of one or more polymers P1 comprising monomers selected from the group consisting of (A) esters of methacrylic acid, acrylic acid, or both
  (a) with a linear alcohol having from 6 to 15 carbon atoms,
  (b) with a linear alcohol having from 16 to 30 carbon atoms,
  (c) with a branched alcohol having from 8 to 40 carbon atoms, and
  (d) with an alcohol having from 1 to 5 carbon atoms, and (B) monomers having a functional group and capable of free-radical copolymerization, the amount of component (b) being defined by a lower and an upper limiting value in mole percent, based on component (a), the lower limiting value being [−0.0526 × component (a) + 10] and the upper limiting value being [−0.158 × component (a) + 25], with the amount of (b) being greater than 5 mole percent, the sum of components (a) and (b) ranging from 10 to 80 mole percent, based on the polymer P1, and the amount of component (c) being from 20 to 90 mole percent, and preferably from 50 to 90 mole percent, the amount of component (d) being from 0 to 50 mole percent, and preferably from 5 to 30 mole percent, and the amount of component (B) being from 0 to 20 mole percent, and preferably from 2 to 15 mole percent, based in each case on the polymer P1, and (II) from 90 to 1 weight percent of one or more polymers P2 comprising monomers selected from the group consisting of (A') esters of methacrylic acid, acrylic acid, or both
  (a') with a linear alcohol having from 6 to 15 carbon atoms,
  (b') with a linear alcohol having from 16 to 30 carbon atoms,
  (c') with a branched alcohol having from 8 to 40 carbon atoms, and
  (d') with an alcohol having from 1 to 5 carbon atoms, and (B') monomers which have functional groups in the molecule and are capable of free radical copolymerization, wherein the amount of component (a') is from 0 to 90 mole percent, and preferably from 30 to 90 mole percent, the amount of component (b') is from 10 to 70 mole percent, the amount of component (c') is from 0 to 90 mole percent, and preferably from 10 to 90 mole percent, and most preferably from 10 to 30 mole percent, the amount of component (d') is from 0 to 50 mole percent, and preferably from 5 to 30 mole percent, and the amount of component (B') is from 0 to 20 mole percent, and preferably from 2 to 15 mole percent, based in each case on the polymer P2. In each case, the sum of (A) and (B) and of (A') and (B') is 100 mole percent.

Lubricating oils within the meaning of the invention are primarily vacuum distillate oils having a paraffin or naphthalene base.

It should be noted that in addition to the solvents, the additives of the invention may further contain VI-improving polyolefins/olefin copolymers (OCP) and/or hydrogenated styrene/diene polymers (HSD) and/or hydrogenated polyisoprenes, preferably block- and graft- copolymers of the type combining polyalkyl acrylates or methacrylates (PAMA) and OCP as described in U.S. Pat. No. 4,290,925, incorporated herein by reference. The amount of the additives represented by the olefin copolymers and hydrogenated styrene/diene polymers or the polymers according to the cited U.S. patent may be from 0 to 70 percent, preferably from 2 to 70, percent by weight of said additive.

The amount of the polymers (P) present in the additives of the invention ranges from 10 to 80 weight percent, and generally from 20 to 80 weight percent. The amount of polymer P1 represented by component (b) should be at least 7 mole percent and preferably is from 7 to 25 mole percent, and most preferably from 10 to 20 mole percent. The amount of component (a) is advantageously reduced to the level permitted by the rules given above. The amount of component (b') in polymer P2 preferably is from 20 to 40 mole percent.

An embodiment in which the polymer P2 is made up only of the components (a') and (b') is also preferred.

So far as both components (a) and (a') are concerned, esters of acrylic acid or methacrylic acid with linear $C_{10}$-$C_{14}$ alcohols, for example, as prepared by the Ziegler process, by hydrolysis of aluminum alkoxides, are preferred. Illustrative of these are the products sold under the trademarks "Lorol", Henkel KG, Düsseldorf, and "Alfol" by Condea, Hamburg.

Components (b) and (b') are preferably esters of acrylic acid or methacrylic acid with linear $C_{16}$-$C_{24}$ alcohols, and particularl $C_{16}$-$C_{20}$ alcohols. Examples are the tallow alcohols and the products sold under the trademark "Alfol" by Condea.

Components (c) and (c') are preferably esters of acrylic acid or methacrylic acid with branched $C_8$-$C_{20}$ alcohols of the isoalkanol type, and particularly isodecyl, isotridecyl, and isooctodecyl alcohols.

Components (a), (b), and (c) and (a'), (b'), and (c') may in turn be grafted onto polyolefins or olefin copolymers of the type mentioned above (OCP).

The weight average molecular weights of the polymers P1 generally range from 50,000 to 500,000, and those of the polymers P2 also range from 50,000 to 500,000, as determined by gel permeation chromatography. Polymers P1 and P2 can be prepared by the usual free radical polymerization methods.

Component (B) of the polymer P1 consists of monomers which are capable of free radical polymerization and which have a functional group in the molecule, and in particular a group which is known to have dispersant or detergent action in oil additives. Illustrative of these are compounds of the general formula

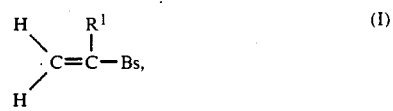

wherein $R_1$ is hydrogen or methyl and Bs is an inert heterocyclic five- or six-membered ring or is

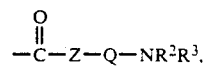

wherein Z is oxygen or $-NR^4$, Q is a linear or branched hydrocarbon bridge having 2 to 10 carbon atoms, $R^2$ and $R^3$ taken alone are alkyl having from 1 to 6 carbon atoms and, taken together with the nitrogen atom, may form a heterocyclic five- or six-membered ring possibly containing additional hetero atoms, and $R^4$ is hydrogen or alkyl having from 1 to 6 carbon atoms.

Examples of such compounds are C- and N-vinyl-pyridine, -vinylpyrrolidone, -vinylcarbazole, and -vinylimidazole and their alkyl derivatives, and particularly the N-vinyl compounds, as well as the dialkylaminoalkyl esters of acrylic acid and methacrylic acid, and particularly dimethylaminoethyl-acrylate and -methacrylate, dimethylaminopropyl-acrylate and -methacrylate, and the corresponding dialkylaminoalkyl acrylamides and methacrylamides, for example dimethylaminopropyl-acrylamide and -methacrylamide.

The definitions given above in Formula (I) apply also to component (B') of polymer P2.

The solvents employed in the additives of the invention are those commonly used in lubricating oil additives, especially paraffin base or naphthene base petroleum oils or the well known ester oils or poly-alpha-olefins. (See *Ullmann's Enzyklopädie der technischen Chemie,* 4th Ed., Vol. 20, pp. 483–529).

PRODUCTION OF POLYMERS P1 AND P2

The polymers can be produced by one of the prior art polymerization methods. A mixture of petroleum oil and of a monomer blend of (a), (b), (c), and optionally (d) and (B) is charged to a reaction vessel advantageously equipped with stirrer, thermometer, reflux condenser, and metering line.

The charge is heated to about 90° C. to 100° C. under a carbon dioxide atmosphere and with stirring. After that temperature has been reached and initiator (preferably a peroxy compound such as a perester or peroxide or an azo compound) has been added, a mixture of the monomers (a), (b), (c), (d), and (B) and of further initiator is metered in. About 2 hours after completion of this addition, still more initiator is added. The total amount of initiator usually is between 1 and 3 weight percent, based on the total amount of monomers. The total polymerization time generally is between 8 and 9 hours. A viscous solution with a polymer content that usually ranges from 40 to 70 weight percent is obtained.

Preparation of Polymer Blends from P1 to P2

The following procedure may be used: One component is introduced into a suitable vessel as an initial charge and heated with stirring to about 80° C. to 120° C. The components to be admixed are also heated to about 80° C. to 120° C. and then added to the initially charged component as rapidly as possible with stirring.

Oil Admixture for Determination of Pour Point, Low-Temperature Viscosity, and Stable Pour Point The additive of the invention is dissolved in the base oil at 50° C. to 60° C. with stirring, optionally together with further additives such as a detergent-inhibitor package and OCP VI improvers.

Use of Additives

The additives of the invention can be added in conventional fashion to lubricating oils in an amount from 0.1 to 30 percent, suitably in an amount from 1 to 20 percent or from 1 to 10 percent, all by weight of said oil. For crankcase oils and automatic transmission fluids, an addition ranging from 1 to 10, and preferably from 2 to 6, percent by weight is indicated, and for hydraulic and gear oils, an addition ranging from 5 to 30, preferably from 10 to 20, percent by weight.

Among the advantages offered by the additives of the invention are the ease with which they can be adapted to any particular base oil, and especially to critical base oils and when OCP's are included in the formulation. In addition to the required viscosity data at 100° C., oil formulations containing the additives of the invention exhibit very good values for pour point and stable pour point and excellent viscosity data over the −15° C. to −40° C. range.

They can be characterized by the following parameters:

| | |
|---|---|
| Pour point/Cloud point | DIN 51 497 |
| Pour stability (stable pour point) | Fed. Test. Meth. 203 Std. No. 791/Cycle C |
| Viscosity (mini-rotary viscometer) | ASTM D 3829 |
| Viscosity (cold cranking simulator) | DIN 51 377 |
| Brookfield viscosity | DIN 51 398 |

A better understanding of the present invention and of its many advantages will be had by referring to the following Examples, given by way of illustration.

EXAMPLES

Preparation of Additives

Additive A

The following mixture is introduced as an initial charge into a four necked flask equipped with stirrer, thermometer, reflux condenser, and metering line:
  250.0 g of petroleum oil ($\eta_{100° C.} = 3.9$ mm$^2$/sec)
  25.0 g of isodecyl methacrylate
  2.8 g of methyl methacrylate
  0.5 g of tert.-butyl peroctoate After these components have been dissolved, the following mixture is metered in over a period of 210 minutes at 84° C.:
  200.0 g of isodecyl methacrylate
  22.2 g of methyl methacrylate
  0.4 g of tert.-butyl peroctoate Two hours after completion of this addition, 0.5 g of tert.-butyl peroctoate is added. Total polymerization time: 8 hours. The batch is then diluted with 125 g petroleum oil ($\eta_{100° C.} = 3.9$ mm$^2$/sec). A clear, viscous solution is obtained.
  Polymer content: 40 weight percent.
  Viscosity (100° C., 40 weight percent): 1100 mm$^2$/sec
  Composition:
  0 mole percent (a)
    0 mole percent (b)

Additive B

Prepared in the same manner as Additive A, with the following exceptions:
Initial charge:
  300.0 g of petroleum oil ($\eta_{100° C.} = 3.9$ mm$^2$/sec)
  22.18 g of isodecyl methacrylate
  7.80 g of the methacrylic acid esters of a mixture of linear C$_{16}$–C$_{18}$ alcohols
  3.32 g of methyl methacrylate
  0.82 g of tert.-butyl peroctoate
Addition:
  177.62 g of isodecyl methacrylate
  62.40 g of the methacrylic acid esters of a mixture of linear C$_{16}$–C$_{18}$ alcohols
  26.68 g of methyl methacrylate
  0.66 g of tert.-butyl peroctoate Two hours after completion of this addition, 0.6 g of tert.-butyl peroctoate is added. On completion of polymerization, the batch is diluted with 150 g of petroleum oil $\eta_{100° C.} = 3.9$ mm$^2$/sec).

Polymer content: 40 weight percent
Viscosity (100° C., 40 weight percent): 970 mm$^2$/sec.
Composition:
  0 mole percent (a)
  15 mole percent (b)

Additive C

Prepared in the same manner as Additive A, with the following exceptions:
Initial charge:
  250.0 g of petroleum oil ($\eta_{100°\,C.}=3.9$ mm$^2$/sec)
  25.0 g of the methacrylic acid esters of a mixture of C$_{12}$–C$_{15}$ alcohols comprising 60 percent of branched alcohol
  2.8 g of methyl methacrylate
  0.5 g of tert.-butyl peroctoate
Addition:
  200.0 g of the methacrylic acid esters of a mixture of C$_{12}$–C$_{15}$ alcohols comprising 60 percent of branched alcohols
  22.2 g of methyl methacrylate
  0.4 g of tert.-butyl peroctoate
Two hours after completion of this addition, 0.5 g of tert.-butyl peroctoate is added. On completion of polymerization, the batch is diluted with 125 g of petroleum oil ($\eta_{100°\,C.}=3.9$ mm$^2$).
Polymer content 40 weight percent
Viscosity (100° C., 40 weight percent): 760 mm$^2$/sec.
Composition:
  31 mole percent (a)
  0 mole percent (b)

Additive D

Prepared in the same manner as Additive A, with the following exceptions: Initial charge
  250.0 g of petroleum oil ($\eta_{100°\,C.}=3.9$ mm$^2$/sec)
  19.3 g of the methacrylic acid esters of a mixture of C$_{12}$–C$_{15}$ alcohols comprising 60 percent of branched alcohols
  5.7 g of the methacrylic acid esters of a mixture of linear C$_{16}$–C$_{18}$ alcohols
  2.8 g of methyl methacrylate
  0.5 g of tert.-butyl peroctoate
Addition.
  154.4 g of the methacrylic acid esters of a mixture of C$_{12}$–C$_{15}$ alcohols comprising 60 percent of branched alcohols
  45.6 g of the methacrylic acid esters of a mixture of linear C$_{16}$–C$_{18}$ alcohols
  22.2 g of methyl methacrylate
  0.4 g of tert.-butyl peroctoate
Two hours after completion of this addition, 0.5 g of tert.-butyl peroctoate is added. On completion of polymerization, the batch is diluted with 125 g of petroleum oil ($\eta_{100°\,C.}=3.9$ mm$^2$/sec).
Polymer content: 40 weight percent.
Viscosity (100° C., 40 weight percent): 670 mm$^2$/sec
Composition:
  24 mole percent (a)
  15 mole percent (b)

Additive E

The following mixture is introduced as an initial charge into a 2-liter four necked flask equipped with stirrer, thermometer, reflux condenser, and metering line:
  1166.5 g of a 15 percent solution in petroleum oil ($\eta_{100°\,C.}=4.5$ mm$^2$/sec) of a commercial ethylene-propylene copolymer comprising 50 weight percent of propylene
  116.64 g of the methacrylic acid esters of a mixture of C$_{12}$–C$_{15}$ alcohols comprising 60 percent of branched alcohols
  12.96 g of methyl methacrylate
  0.6 g of tert.-butyl peroctoate
After these components have dissolved, the following mixture is metered in over a period of 210 minutes at 90° C.:
  175.9 g of the methacrylic acid esters of a mixture of C$_{12}$–C$_{15}$ alcohols comprising 60 percent of branched alcohols
  19.5 g of methyl methacrylate
  1.0 g of tert.-butyl peroctoate
Two hours after completion of this addition, 0.65 g of tert.-butyl peroctoate is added. Total polymerization time: 8 hours. A clear, viscous solution is obtained.
Polymer content: 33.5 weight percent
Viscosity (100° C., 33.5 weight percent): 1700 mm$^2$/sec.
Composition of polyalkyl methacrylate component:
  31 mole percent (a)
  0 mole percent (b)

Additive F

Prepared in the same manner as Additive E, with the following exceptions: Initial charge:
  1166.5 g of a 15 percent solution in petroleum oil ($\eta_{100°\,C.}=4.5$ mm$^2$/sec) of a commercial ethylene-propylene copolymer comprising 50 weight percent of propylene
  90.0 g of the methacrylic acid esters of a mixture of C$_{12}$–C$_{15}$ alcohols comprising 60 percent of branched alcohols
  26.6 g of the methacrylic acid esters of a mixture of linear C$_{16}$–C$_{18}$ alcohols
  13.0 g of methyl methacrylate
  0.6 g of tert.-butyl peroctoate
Addition:
  135.8 g of the methacrylic acid esters of a mixture of C$_{13}$–C$_{15}$ alcohols comprising 60 percent of branched alcohols
  40.1 g of the methacrylic acid esters of a mixture of linear C$_{16}$–C$_{18}$ alcohols
  19.5 g of methyl methacrylate
  1.0 g of tert.-butyl peroctoate
Polymer content: 33.5 weight percent
Viscosity (100° C., 33.5 weight percent): 1650 mm$^2$/sec
Composition of polyalkyl methacrylate component:
  24 mole percent (a)
  15 mole percent (b)

Additive G

The following mixture is introduced as an initial charge into a 1 l four necked flask equipped with stirrer, thermometer, reflux condenser and metering line:
  210.0 g of petroleum oil ($\eta_{100°\,C.}=3{,}9$ mm$^2$/sec)
  18.1 g of the methacrylic acid esters of a mixture of C$_{12}$–C$_{15}$ alcohols containing 23 percent of branched alcohols
  5.2 g of methacrylic acid ester of a mixture of linear C$_{16}$–C$_{18}$ alcohols
  0.84 g of tert.-butyl peroctoate
After the components have been dissolved the following mixture is metered in over a period of 210 minutes at 100° C.

362.16 g of methacrylic acid ester of a mixture of $C_{12}$–$C_{15}$ alcohols with 23 percent of branched alcohols 104.54 g of methacrylic acid ester of a mixture of linear $C_{16}$–$C_{18}$ alcohols 4.7 g of tert.-butyl peroctoate Two hours after completion of this addition 1 g of tert-butylperoctoate is added. Total polymerization time: 8 hours. A clear viscous solution is obtained:

Polymer content: 70 weight percent)
Viscosity (100° C., 70 weight percent): 560 mm²/sec.
Composition:
  62 mole percent a'
  19 mole percent b'
  19 mole percent c'

Additive H

Prepared in the same manner as Additive G, with the following exceptions:
Initial charge:
  210.0 g of petroleum oil ($\eta_{100°\,C.}=3,9$ mm²/sec)
  12.84 g of the methacrylic acid ester of a mixture of $C_{12}$–$C_{15}$ alcohols containing 23 percent of branched alcohols
  10.46 g of the methacrylic ester of a mixture of linear $C_{16}$–$C_{18}$ alcohols
  0.84 g of tert.-butyl peroctoate
Addition:
  257.2 g of the methacrylic ester of a mixture of $C_{12}$–$C_{15}$ alcohols containing 23 percent of branched alcohols
  209.5 g of the methacrylic ester of a mixture of linear $C_{16}$–$C_{18}$ alcohols
  4.7 g of tert.-butyl peroctoate Two hours after completion of this addition 1 g of tert.-butylperoctoate is added. Total polymerization time: 8 hours.

Polymer content: 70 weight percent viscosity (100° C; 70 weight percent): 540 mm²/sec
composition:
  46 mole percent a'
  40 mole percent b'
  14 mole percent c'

Additive I

Prepared in the same manner as Additive G, with the following exceptions:
Initial charge:
  210.0 g petroleum oil ($\eta_{100°\,C.}=3,9$ mm²/sec)
  10.57 g of the methacrylic acid ester of a mixture of $C_{12}$–$C_{15}$ alcohols containing 60 percent of branched alcohols
  10.40 g of the methacrylic acid ester of a mixture of linear $C_{16}$–$C_{18}$ alcohols
  2.33 g of methyl methacrylate
  0.84 g of tert.-butyl peroctoate
Addition:
  211.7 g of the methacrylic ester of a mixture of $C_{12}$–$C_{15}$ alcohols containing 60 percent of branched alcohols
  208.33 g of the methacrylic ester of a mixture of linear $C_{16}$–$C_{18}$ alcohols
  46.67 g of methyl methacrylate
  0.84 g of tert.-butyl peroctoate Two hours after completion of this addition 1 g of tert.-butylperoctoate is added. Total polymerization time: 8 hours.

A clear viscous solution is obtained.
Polymer content: 70 weight percent: 750 mm²/sec
Composition:
  16 mole percent a'
  35 mole percent b'
  25 mole percent c'
  24 mole percent d'

TABLE 1

Determination of pour point in °C. in conformity with DIN 51,597 in NS 150 petroleum oil (viscosity, 5.4 mm²/sec at 100° C.)

| | Additive | Amount of additive added, wt. % | | | | Amount of additive added, wt. % | | | |
|---|---|---|---|---|---|---|---|---|---|
| | | 2.5 | 5.0 | 7.5 | 10.0 | 2.5⁻ | 5.0⁻ | 7.5⁻ | 10.0⁻ |
| Example 1 | B | −12 | −18 | −27 | −33 | −39 | −39 | −42 | −42 |
| Comparative Example 1 | A | −12 | −12 | −12 | −12 | −33 | −33 | −33 | −33 |

⁻ Plus 0.2% of a Pour-Point Depressant according to Additive G

TABLE 2

Determination of pour point in °C. in conformity with DIN 51,597 in NS 150 petroleum oil (viscosity, 5.4 mm²/sec at 100° C.)

| | Additive | Amount of additive added, wt. % 3.25⁺ | | Additive | Amount of additive added, wt. % 6.0⁻ |
|---|---|---|---|---|---|
| Example 2 | D | −42 | | Example 3 | F | −39 |
| Comparative Example 2 | C | −33 | | Comparative Example 3 | E | −33 |

⁻ Plus 0.3 weight percent of Additive H

TABLE 3

Determination of pour point in °C. in conformity with DIN 51,597 in NS 150 petroleum oil (viscosity, 5.4 mm²/sec at 100° C.)

| | Additive | Amount of additive added, wt. % | | | | Amount of additive added, wt. % | | | |
|---|---|---|---|---|---|---|---|---|---|
| | | 2.5 | 5.0 | 7.5 | 10.0 | 2.5⁺ | 5.0⁻ | 7.5⁻ | 10.0⁻ |
| Example 4 | B | −12 | −18 | −27 | −33 | −38 | −38 | −40 | −40 |
| Comparative Example 4 | A | −12 | −12 | −12 | −12 | −32 | −32 | −32 | −32 |

⁻ Plus 0.2% weight percent of Additive I

A clear viscous solution is obtained.

What is claimed is:

1. A multifunctional additive for lubricating oils containing n-paraffins, in particular for improving the viscosity index thereof, said additive comprising a solvent and a blend of polymers containing (I) from 10 to 99 percent, by weight of said additive, of at least one polymer P1 comprising monomers selected from the group consisting of (A)
  (a) esters of methacrylic acid, acrylic acid, and mixtures thereof and a linear alcohol having 6 to 15 carbon atoms,
  (b) esters of methacrylic acid, acrylic acid, and mixtures thereof and a linear alcohol having from 16 to 30 carbon atoms,
  (c) esters of methacrylic acid, acrylic acid, and mixtures thereof and a branched alcohol having from 8 to 40 carbon atoms, and
  (d) esters of methacrylic acid, acrylic acid, and mixtures thereof and an alcohol having from 1 to 5 carbon atoms, and (B) monomers of the formula $$H_2C=\underset{R_1}{\overset{|}{C}}-B_s,$$

wherein $R_1$ is hydrogen or methyl and $B_s$ is an inert heterocyclic five-or six-membered ring or is $$-\overset{O}{\overset{\|}{C}}-Z-Q-NR_2R_3,$$

wherein
  Z is oxygen or $NR_4$,
  Q is a hydrocarbon bridge having 2 to 10 carbon atoms,
  $R_2$ and $R_3$ taken alone are alkyl having from 1 to 6 carbon atoms and, taken together with the nitrogen atom, form a heterocyclic five-or six-membered ring or such a ring containing additional hetero atoms, and
  $R_4$ is hydrogen or alkyl having from 1 to 6 carbon atoms, the amount of component (A)(b) having a lower and an upper limiting value in mole percent, based on component (A)(a), the lower limiting value being [−0.0526×component (A)(a)+10] and the upper limiting value being[−0.158-×component (A)(a)+—25], with the amount of (A)(b) being at least 7 mole percent, the sum of components (A)(a) and (A)(b) being from 10 to 80 mole percent, based on polymer P1, and the amount of component (A)(c) being from 20 to 90 mole percent, the amount of component (A)(d) from 0 to 50 mole percent, and the amount of component (B) from 0 to 20 mole percent, based in each case on the polymer P1, and (II) from 90 to 1 weight percent of at least one polymer P2 comprising monomers selected from the group consisting of (A')
  (a') esters of methacrylic acid, acrylic acid, and mixtures thereof and a linear alcohol having from 6 to 15 carbon atoms,
  (b') esters of methacrylic acid, acrylic acid, and mixtures thereof with a linear alcohol having from 16 to 30 carbon atoms,
  (c') esters of methacrylic acid, acrylic acid, and mixtures thereof and a branched alcohol having from 8 to 40 carbon atoms, and
  (d') esters of methacrylic acid, acrylic acid, and mixtures thereof and an alcohol having from 1 to 5 carbon atoms, and (B') monomers of the formula $$H_2C=\underset{R_1}{\overset{|}{C}}-B_s,$$

wherein $R_1$ is hydrogen or methyl and $B_s$ is an inert heterocyclic five- or six-membered ring or is $$-\overset{O}{\overset{\|}{C}}-Z-Q-NR_2R_3,$$

wherein
  Z is oxygen or $NR_4$,
  Q is a hydrocarbon bridge having 2 to 10 carbon atoms,
  $R_2$ and $R_3$ taken alone are alkyl having from 1 to 6 carbon atoms and, taken together with the nitrogen atom, form a heterocyclic five-or six-membered ring or such a ring containing additional hetero atoms, and
  $R_4$ is hydrogen or alkyl having from 1 to 6 carbon atoms, the amount of component (a') being from 0 to 90 mole percent, the amount of component (b') being from 10 to 70 mole percent, the amount of component (c') being from 0 to 90 mole percent, the amount of component (d') being from 0 to 50 mole percent, and the amount of component (B') being from 0 to 20 mole percent, based in each case on the polymer P2.

2. An additive as in claim 1 which additionally comprises up to 70 percent, by weight of said additive, of a member selected from the group consisting of VI-improving olefin copolymers, hydrogenated styrene-diene copolymers, and hydrogenated polyisoprene.

3. An additive a in claim 2 wherein said VI-improving olefin copolymers and said hydrogenated styrene-diene copolymers are a block- or graft-copolymer comprising at least one member selected from the group consisting of acrylate ester and methacrylate ester monomers.

4. An additive as in claim 1 wherein component (b) of polymer P1 is at least 7 mole percent of polymer P1.

5. An additive as in claim 1 wherein component (b') of polymer P2 is from 20 to 40 mole percent of polymer P2.

6. An additive as in claim 1 wherein component (a) of polymer P1, component (a') of polymer P2, or both, are esters of a linear alcohol having from 10 to 14 carbon atoms.

7. An additive as in claim 1 wherein component (b) of polymer P1, component (b') of polymer P2, or both, are esters of a linear alcohol having from 16 to 24 carbon atoms.

8. An additive as in claim 1 wherein component (b) of polymer P1, component (b') of polymer P2, or both, are esters of a linear alcohol having from 16 to 20 carbon atoms.

9. An additive as in claim 1 wherein component (c) of polymer P1, component (c') of polymer P2, or both, are esters of a branched alcohol having from 8 to 20 carbon atoms.

10. An additive as in claim 9 wherein said branched alcohol having from 8 to 20 carbon atoms is a member selected from the group consisting of iso-$C_{10}$-, iso-$C_{13}$-, and iso-$C_{18}$-alcohols.

11. A lubricating oil containing from 0.1 to 30 percent by weight of said oil, of an additive as in claim 1.

12. A lubricating oil containing from 1 to 20 percent, by weight of said oil, of an additive as in claim 1.

13. A lubricating oil containing from 1 to 10 percent, by weight of said oil, of an additive as in claim 1.

14. An additive as in claim 2 wherein said VI-improving olefin copolymers and said hydrogenated styrene-diene copolymers contain a block- or graft-copolymer comprising at least one member selected from the group consisting of acrylate ester and methacrylate ester monomers.

15. An additive as in claim 2 wherein the total amount of said polymers P1 and P2 and of said member selected from the group consisting of VI-improving olefin copolymers, hydrogenated styrene-diene copolymers, and hydrogenated polyisopropylene is from 20 to 80 percent by weight of the additive.

* * * * *

UNITED STATES PATENT AND TRADEMARK OFFICE
CERTIFICATE OF CORRECTION

PATENT NO. : 5,043,087
DATED : Aug. 27, 1991
INVENTOR(S) : Pennewiss et al.

It is certified that error appears in the above-identified patent and that said Letters Patent is hereby corrected as shown below:

Column 11, lines 49 - 50, the material in brackets should read:
-- [-0.158 x component (A)(a) + 25] --.
Column 12, line 44, "a" should be -- as --.

Signed and Sealed this

Twenty-third Day of February, 1993

Attest:

STEPHEN G. KUNIN

*Attesting Officer*     *Acting Commissioner of Patents and Trademarks*